(12) United States Patent
Gagnon et al.

(10) Patent No.: US 8,162,096 B2
(45) Date of Patent: Apr. 24, 2012

(54) VEHICLE HAVING A VARIABLE ASSIST POWER STEERING ASSEMBLY

(75) Inventors: Marc Gagnon, Austin (CA); Daniel Leclerc, St-Denis-de-Brompton (CA)

(73) Assignee: Bombardier Recreational Products Inc., Valcourt (CA)

( * ) Notice: Subject to any disclaimer, the term of this patent is extended or adjusted under 35 U.S.C. 154(b) by 82 days.

(21) Appl. No.: 12/863,084

(22) PCT Filed: Jun. 26, 2008

(86) PCT No.: PCT/US2008/068310
§ 371 (c)(1),
(2), (4) Date: Jul. 15, 2010

(87) PCT Pub. No.: WO2009/096998
PCT Pub. Date: Aug. 6, 2009

(65) Prior Publication Data
US 2011/0048840 A1    Mar. 3, 2011

Related U.S. Application Data

(60) Provisional application No. 61/024,998, filed on Jan. 31, 2008.

(51) Int. Cl.
*B62D 5/04* (2006.01)
(52) U.S. Cl. ....................................... 180/446
(58) Field of Classification Search .................. 180/446; 701/41
See application file for complete search history.

(56) References Cited

U.S. PATENT DOCUMENTS

| | | | |
|---|---|---|---|
| 6,152,255 A | 11/2000 | Noro et al. | |
| 6,497,303 B1 * | 12/2002 | Nishimura et al. | 180/446 |
| 6,499,559 B2 | 12/2002 | McCann et al. | |
| 6,982,120 B2 * | 1/2006 | Schuster | 428/472 |
| 7,216,733 B2 | 5/2007 | Iwami et al. | |
| 2008/0015752 A1 | 1/2008 | Riepold et al. | |

FOREIGN PATENT DOCUMENTS

| | | |
|---|---|---|
| DE | 102007033066 A1 | 1/2008 |
| EP | 0243181 A2 | 10/1987 |
| EP | 1679249 A1 | 7/2006 |
| EP | 1845008 A2 | 10/2007 |
| FR | 2853295 A | 10/2004 |
| JP | 63116982 A | 5/1988 |
| JP | 5058317 A | 3/1993 |

(Continued)

OTHER PUBLICATIONS

International Search Report of PCT/US2008/068310, Oct. 17, 2008, Sleightholme-Albanis.

(Continued)

*Primary Examiner* — Tony Winner
(74) *Attorney, Agent, or Firm* — Osler, Hoskin & Harcourt LLP

(57) ABSTRACT

A wheeled vehicle (10) has a power steering assembly. The vehicle can operate in an AWD mode and a 2WD mode. The degree of steering assist provided by the power steering assembly is determined from one of various steering maps (8A-8D; 114A-D). The steering map is selected based on whether the vehicle is operating in the AWD mode or the RWD mode and on a steering mode selected by a steering mode control switch (100) on the vehicle. A method of controlling a power steering assembly is also disclosed.

20 Claims, 10 Drawing Sheets

FOREIGN PATENT DOCUMENTS

| | | |
|---|---|---|
| JP | 2003048565 A | 2/2003 |
| JP | 2006143011 | 6/2006 |
| JP | 2008001321 | 1/2008 |

OTHER PUBLICATIONS

English abstract of FR 2853295, Published Oct. 8, 2004.

English abstract of JP 2003048565, Published Feb. 18, 2003.

English abstract of JP 5058317, Published Mar. 9, 1993.

English abstract of JP 63116982, Published May 21, 1988.

English abstract of JP 2008001321, Published Jan. 10, 2008.

English abstract of JP 2006143011, Published Jun. 8, 2006.

\* cited by examiner

VEHICLE HAVING A VARIABLE ASSIST POWER STEERING ASSEMBLY

CROSS-REFERENCE

The present application claims priority to U.S. Provisional Patent Application No. 61/024,998, filed Jan. 31, 2008, the entirety of which is incorporated herein by reference.

FIELD OF THE INVENTION

The present invention relates to a vehicle having a variable assist power steering assembly.

BACKGROUND OF THE INVENTION

Many wheeled vehicles, such as all-terrain vehicles (ATVs) and recreational utility vehicles (RUVs), are provided with power steering assemblies. Power steering assemblies typically use an actuator, such as an electric motor or a hydraulic actuator, to apply torque to a steering assembly of the vehicle in response to a driver of the vehicle actuating the steering assembly so as to assist in steering the vehicle. As would be understood, power steering assemblies advantageously reduce the effort required by the driver for steering the vehicle.

Although many power steering assemblies are programmed to reduce the degree of assistance provided as the speed of the vehicle increases in order to help avoiding false manoeuvres, most do not take into account other factors which may require the degree of assistance to vary. For example, some drivers may prefer to have more or less steering assistance. Also, driving a vehicle on a trail or a road does not usually require the vehicle to make sharp turns, and as such less steering assistance would be required. If however, a vehicle, such as an ATV, is driven in a forest for example, then the vehicle most likely has to make sharp turns, and as such more steering assistance would be required. Finally, some vehicles offer the option of driving all the wheels of the vehicle (all-wheel drive or AWD) or driving only the rear wheels of the vehicle (rear-wheel drive or RWD). In the AWD mode, the joints used to operatively connect the front wheels to the engine are turning which creates more friction than when in the RWD mode (in which case the joints are under load). As such, more steering assistance would be required when operating in the AWD mode than in the RWD mode.

Therefore, there is a need for a vehicle having a power steering assembly in which the amount of steering assist provided varies depending on one or more factors. The is also a need for a method of controlling such a power steering assembly.

SUMMARY OF THE INVENTION

It is an object of the present invention to ameliorate at least some of the inconveniences present in the prior art.

It is also an object of the present invention to provide a wheeled vehicle having a power steering assembly. The vehicle can operate in an AWD mode and a RWD mode. The degree of steering assist provided by the power steering assembly is determined from one of various steering maps. The steering map is selected based on whether the vehicle is operating in the AWD mode or the RWD mode and on a steering mode selected by a steering mode control switch on the vehicle.

It is another object of the present invention to provide a method of controlling a power steering assembly such as the one described above.

In one aspect, the invention provides a vehicle having a frame, two front wheels suspended from the frame, each of the two front wheels including a tire, at least one rear wheel suspended from the frame, the at least one rear wheel including a tire, at least one seat mounted on the frame, a steering assembly disposed forwardly of the at least one seat and being operatively connected to the two front wheels, and an engine mounted to the frame. The engine is operatively connected to the at least one rear wheel, and is selectively operatively connectable to the two front wheels. The vehicle operates in an all-wheel drive (AWD) mode when the engine is operatively connected to the two front wheels and the at least one rear wheel. The vehicle operates in a rear-wheel drive (RWD) mode when the engine is operatively connected to the at least one rear wheel and is disconnected from the two front wheels. An electric motor is operatively connected to the steering assembly for assisting the steering of the vehicle. An input torque sensor is operatively connected to the steering assembly for sensing a torque applied to the steering assembly by a user of the vehicle. A steering control unit is electrically connected to the electric motor and the input torque sensor. A steering mode control switch for selecting between a first steering mode and a second steering mode is electrically connected to the steering control unit. The steering control unit selects one of a first steering map, a second steering map, a third steering map, and a fourth steering map based on the drive mode (AWD or RWD) of the vehicle and the one of the first and second steering modes selected by the steering mode control switch. The first steering map is selected when the vehicle is operating in the AWD mode and the first steering mode is selected. The second steering map is selected when the vehicle is operating in the AWD mode and the second steering mode is selected. The third steering map is selected when the vehicle is operating in the RWD mode and the first steering mode is selected. The fourth steering map is selected when the vehicle is operating in the RWD mode and the second steering mode is selected. The steering control unit determines an output torque corresponding to the torque sensed by the input torque sensor using the selected one of the first, second, third, and fourth steering maps. The steering control unit controls the electric motor to apply the corresponding output torque to the steering assembly.

In an additional aspect, for a given speed within a range of vehicle speeds and for an identical torque sensed by the input torque sensor: the corresponding output torque in the first steering map is greater than in the second steering map, the corresponding output torque in the third steering map is greater than in the fourth steering map, the corresponding output torque in the first steering map is greater than in the third steering map, and the corresponding output torque in the second steering map is greater than in the fourth steering map.

In a further aspect, the vehicle has a coupling movable between a first position and a second position, the first position operatively connecting the engine to the two front wheels, the second position disconnecting the engine from the two front wheels. An actuator is operatively connected to the coupling for moving the coupling between the first and second position. A vehicle drive mode switch for selecting between the AWD mode and the RWD mode is electrically connected to the actuator such that the actuator moves the coupling to the first position when the AWD mode is selected by the vehicle drive mode switch and moves the coupling to the second position when the RWD mode is selected by the vehicle drive mode switch.

In an additional aspect, the vehicle has an AWD/RWD switch electrically connected to the actuator, the vehicle drive mode switch, and the steering control unit. The AWD/RWD switch moves to an AWD position when the AWD mode is selected by the vehicle drive mode switch, the AWD/RWD switch thereby causing the actuator to move the coupling to the first position. The AWD/RWD switch moves to an RWD position when the RWD mode is selected by the vehicle drive mode switch, the AWD/RWD switch thereby causing the actuator to move the coupling to the second position. The steering control unit determines the drive mode of the vehicle based on a position of the AWD/RWD switch.

In a further aspect, the vehicle has a display cluster disposed forwardly of the at least one seat. The display cluster is electrically connected to the steering control unit. The vehicle drive mode switch and the steering mode control switch are electrically connected to the steering control unit via the display cluster.

In an additional aspect, the steering assembly includes a handlebar, and the vehicle drive mode switch is disposed on the handlebar.

In a further aspect, the steering mode control switch is disposed on the handlebar.

In an additional aspect, the vehicle has a vehicle speed sensor for sensing a speed of the vehicle. The vehicle speed sensor is electrically connected to the steering control unit. For each of the first, second, third, and fourth steering maps, the corresponding output torque decreases as the speed of the vehicle increases.

In a further aspect, the vehicle has a battery electrically connected to the electric motor. The steering control unit controls the electric motor to apply a reduced output torque to the steering assembly when a voltage of the battery is below a predetermined voltage. The reduced output torque is less than the corresponding output torque.

In an additional aspect, the vehicle has at least one load sensor for sensing a load applied to the vehicle. The at least one load sensor is electrically connected to the steering control unit. The steering control unit controls the electric motor to apply an adjusted output torque to the steering assembly. The adjusted output torque is calculated based on at least the corresponding output torque and the load sensed by the at least one load sensor.

In a further aspect, the at least one load sensor includes a passenger presence sensor and a cargo load sensor. The passenger presence sensor is positioned under the at least one seat. The cargo load sensor is positioned under a cargo receiving space of the vehicle.

In a additional aspect, the vehicle also includes at least one load sensor for sensing a load applied to the vehicle. The at least one load sensor is electrically connected to the steering control unit. The steering control unit selects one of the first steering map, the second steering map, the third steering map, the fourth steering map, a fifth steering map, a sixth steering map, a seventh steering map, and an eighth steering map based on the drive mode of the vehicle, the one of the first and second steering modes selected by the steering mode control switch, and a load sensed by the at least one load sensor. One of the first, second, third, and fourth steering maps is selected when the load sensed by the at least one load sensor is less than or equal to a predetermined load. The fifth steering map is selected when the vehicle is operating in the AWD mode, the first steering mode is selected, and the load sensed by the at least one load sensor is greater than the predetermined load. The sixth steering map is selected when the vehicle is operating in the AWD mode, the second steering mode is selected, and the load sensed by the at least one load sensor is greater than the predetermined load. The seventh steering map is selected when the vehicle is operating in the RWD mode, the first steering mode is selected, and the load sensed by the at least one load sensor is greater than the predetermined load. The eighth steering map is selected when the vehicle is operating in the RWD mode, the second steering mode is selected, and the load sensed by the at least one load sensor is greater than the predetermined load. The steering control unit determines an output torque corresponding to the torque sensed by the input torque sensor using the selected one of the first, second, third, fourth, fifth, sixth, seventh, and eighth steering maps.

In another aspect, the invention provides a method of controlling a power steering assembly of a vehicle. The power steering assembly includes an electric motor operatively connected to a steering assembly of the vehicle. The method comprises: determining whether the vehicle is operating in an all-wheel drive (AWD) mode or a two-wheel drive (2WD) mode, selecting one of a first steering mode and a second steering mode, selecting a first steering map when the vehicle operates in the AWD mode and the first steering mode is selected, selecting a second steering map when the vehicle operates in the AWD mode and the second steering mode is selected, selecting a third steering map when the vehicle operates in the 2WD mode and the first steering mode is selected, selecting a fourth steering map when the vehicle operates in the 2WD mode and the second steering mode is selected, sensing a torque applied to the steering assembly by a driver of the vehicle, determining an output torque corresponding to the torque applied to the steering assembly by the driver of the vehicle using the selected one of the first, second, third, and fourth steering maps, and controlling the electric motor to apply the corresponding output torque to the steering assembly.

In a further aspect, for a given speed within a range of vehicle speeds and for an identical torque applied to the steering assembly by the driver of the vehicle: the corresponding output torque in the first steering map is greater than in the second steering map, the corresponding output torque in the third steering map is greater than in the fourth steering map, the corresponding output torque in the first steering map is greater than in the third steering map, and the corresponding output torque in the second steering map is greater than in the fourth steering map.

In an additional aspect, the method comprises selecting one of the AWD mode and the 2WD mode.

In a further aspect, the method comprises sensing a speed of the vehicle. For each of the first, second, third, and fourth steering maps, the corresponding output torque decreases as the speed of the vehicle increases.

In an additional aspect, the method comprises sensing a voltage of a battery powering the electric motor, and controlling the electric motor to apply the corresponding output torque to the steering assembly includes controlling the electric motor to apply a reduced output torque to the steering assembly when the voltage of the battery is below a predetermined voltage. The reduced output torque is less than the corresponding output torque.

In a further aspect, the method comprises sensing a load applied to the vehicle, and controlling the electric motor to apply the corresponding output torque to the steering assembly includes controlling the electric motor to apply an adjusted output torque to the steering assembly. The adjusted output torque is calculated based at least the corresponding output torque and the sensed load.

In an additional aspect, sensing a load applied to the vehicle includes: sensing a load applied to at least one seat of the vehicle, and sensing a load applied to a cargo receiving space of the vehicle.

In a further aspect, the method comprises sensing a load applied to the vehicle, selecting one of the first, second, third, and fourth steering maps when the load sensed is less than or equal to a predetermined load, selecting a fifth steering map when the vehicle operates in the AWD mode, the first steering mode is selected, and the load sensed is above the predetermined load, selecting a sixth steering map when the vehicle operates in the AWD mode, the second steering mode is selected, and the load sensed is above the predetermined load, selecting a seventh steering map when the vehicle operates in the 2WD mode, the first steering mode is selected, and the load sensed is above the predetermined load, selecting an eighth steering map when the vehicle operates in the 2WD mode, the second steering mode is selected, and the load sensed is above the predetermined load, and determining the output torque includes determining the output torque corresponding to the torque applied to the steering assembly by the driver of the vehicle using the selected one of the first, second, third, fourth, fifth, sixth, seventh, and eighth steering maps.

For purposes of this application terms related to spatial orientation such as forwardly, rearwardly, left, and right, are as they would normally be understood by a driver of the vehicle sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Aspects of the present invention will be described with respect to an all-terrain vehicle (ATV), and a recreational utility vehicle (RUV). However it should be understood that aspects of the present invention could be used on other types of vehicles.

Figure 1:
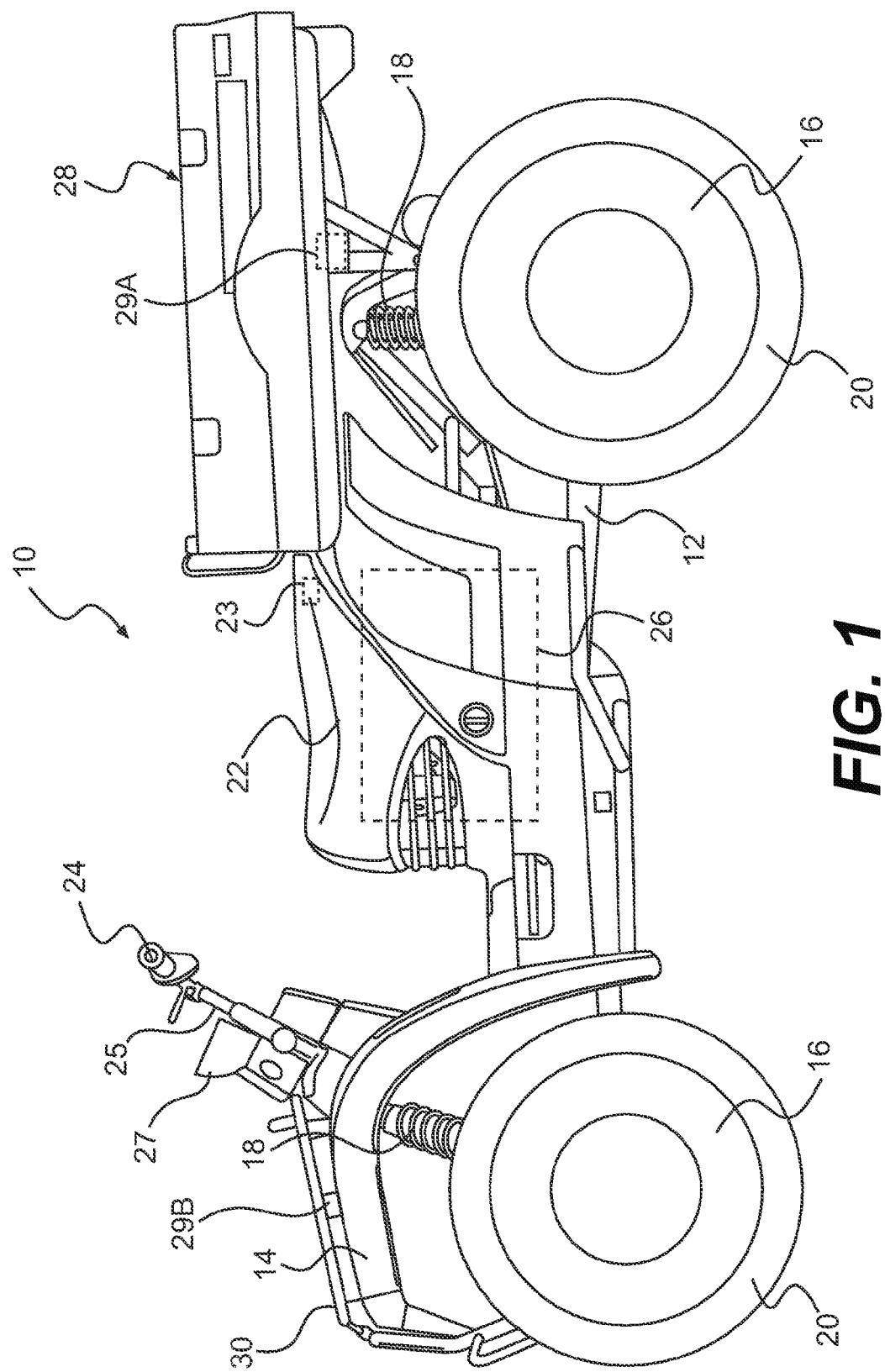
FIG. 1 is a left side elevation view of an all-terrain vehicle (ATV) in accordance with aspects of the present invention.

FIG. 1 illustrates an ATV 10. The ATV 10 has a frame 12 to which a vehicle body 14 is mounted. Four wheels 16 are suspended from the frame 12 via suspension elements 18. Each of the four wheels 16 has a tire 20. It is contemplated that the ATV 10 could have six or more wheels 16. A straddle seat 22 is mounted on the frame 12 to accommodate a driver of the ATV 10 and a passenger behind the driver. A passenger presence sensor 23, described in greater detail below, is disposed under the portion of the seat 22 where the passenger would be seated. A steering assembly including a handlebar 24 connected to a steering column 25 is disposed forwardly of the straddle seat 22. The steering assembly is operatively connected to the two front wheels 16 to permit steering of the ATV 10 as described in greater detail below. A display cluster 27 is disposed forwardly of the handlebar 24. The display cluster 27 displays information to the driver such as vehicle speed and engine speed. An engine 26, shown schematically in FIG. 1, is mounted to the frame 12 below the straddle seat 22. The engine 26 is operatively connected to the four wheels 16 to power the ATV 10, as described in greater detail below. A cargo receiving space in the form of a cargo box 28 is pivotally mounted to the frame 12 rearwardly of the straddle seat 22. It is contemplated that the ATV 10 may not be provided with the cargo box 28. A cargo load sensor 29A, described in greater detail below, is disposed under the cargo box 28. Another cargo receiving space in the form of a cargo rack 30 is disposed on the vehicle body 14 forwardly of the handlebar 24. A cargo load sensor 29B, described in greater detail below, is disposed under the cargo rack 30. The ATV 10 has other features and components common to most ATVs such as footrests. As it is believed that these features and components would be readily recognized by one of ordinary skill in the art, further explanation and description of these components will not be provided herein.

Figure 2:
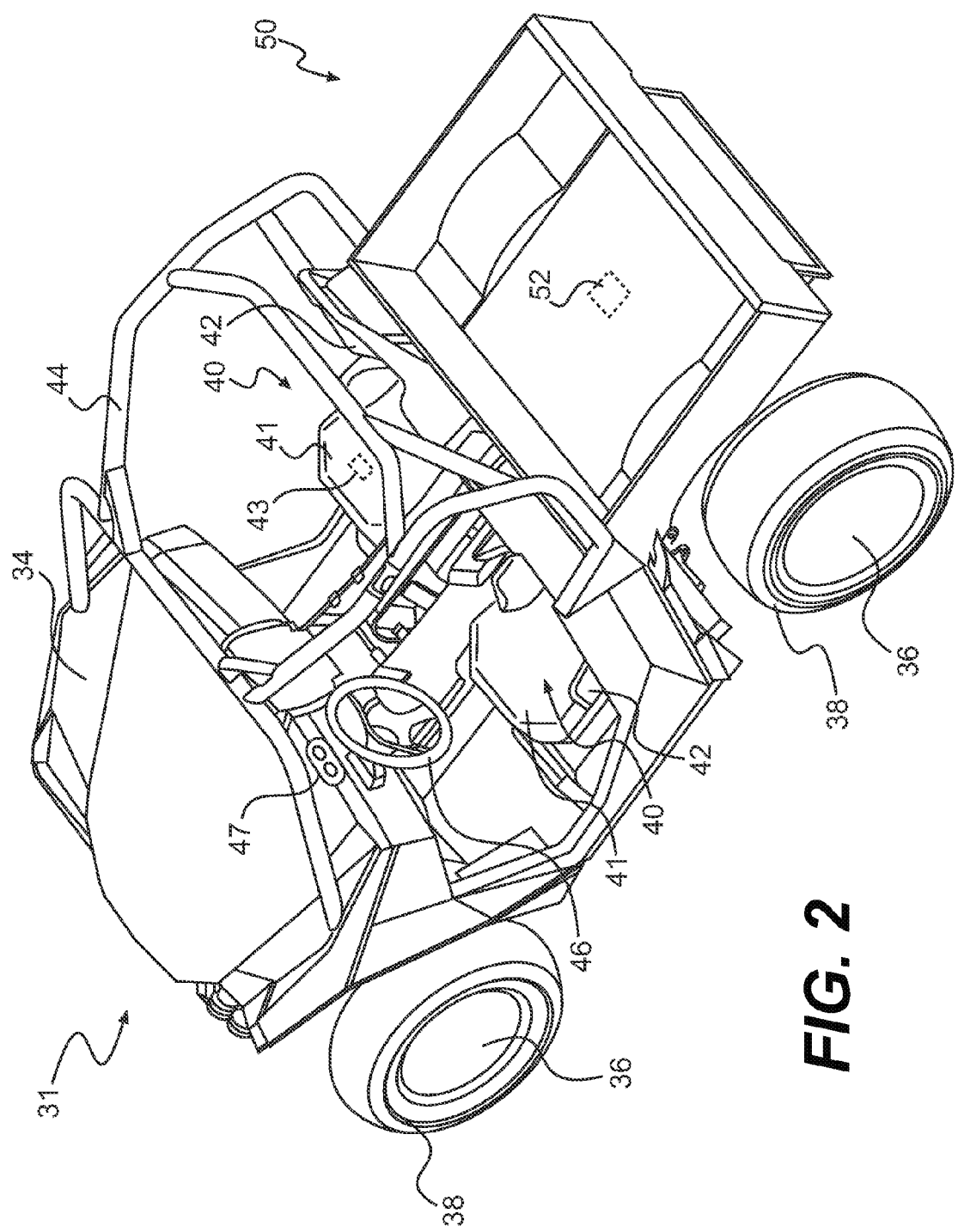
FIG. 2 is a perspective view, taken from a rear, left side of a recreational utility vehicle (RUV) in accordance with aspects of the present invention.

FIG. 2 illustrates an RUV 31. The RUV 31 has a frame (not shown) to which a vehicle body 34 is mounted. Four wheels 36 are suspended from the frame via suspension elements (not shown). Each of the four wheels 36 has a tire 38. It is contemplated that the RUV 31 could have six or more wheels 36. A pair of seats 40, each having a seat base 41 and a backrest 42, are mounted laterally beside each other on the frame to accommodate a driver and a passenger of the RUV 31. A passenger presence sensor 43 is disposed under the seat base 41 of the passenger seat 40. A cage 44 is connected to the frame and is disposed around the area where the seats 40 are located. A steering assembly including a steering wheel 46 connected to a steering column (not shown) is disposed forwardly of the driver seat 40. The steering assembly is operatively connected to the two front wheels 36 to permit steering of the RUV 31. A display cluster 47 is disposed forwardly of the steering wheel 46. The display cluster 47 displays information to the driver such as vehicle speed and engine speed. An engine (not shown) is mounted to the frame between the seats 40. The engine is operatively connected to the four wheels 36 to power the RUV 31. A cargo receiving space in the form of a cargo box 50 is pivotally mounted to the frame rearwardly of the seats 40. A cargo load sensor 52 is disposed under the cargo box 50. It is contemplated that the RUV 31 may not be provided with the cargo box 50. The RUV 31 has other features and components such as headlights. As it is believed that these features and components would be readily recognized by one of ordinary skill in the art, further explanation and description of these components will not be provided herein.

FIGS. 3 to 8D will now be described with reference to the ATV 10. It should be understood however that the description provided could also apply to the RUV 31, unless specified otherwise.

Figure 3:
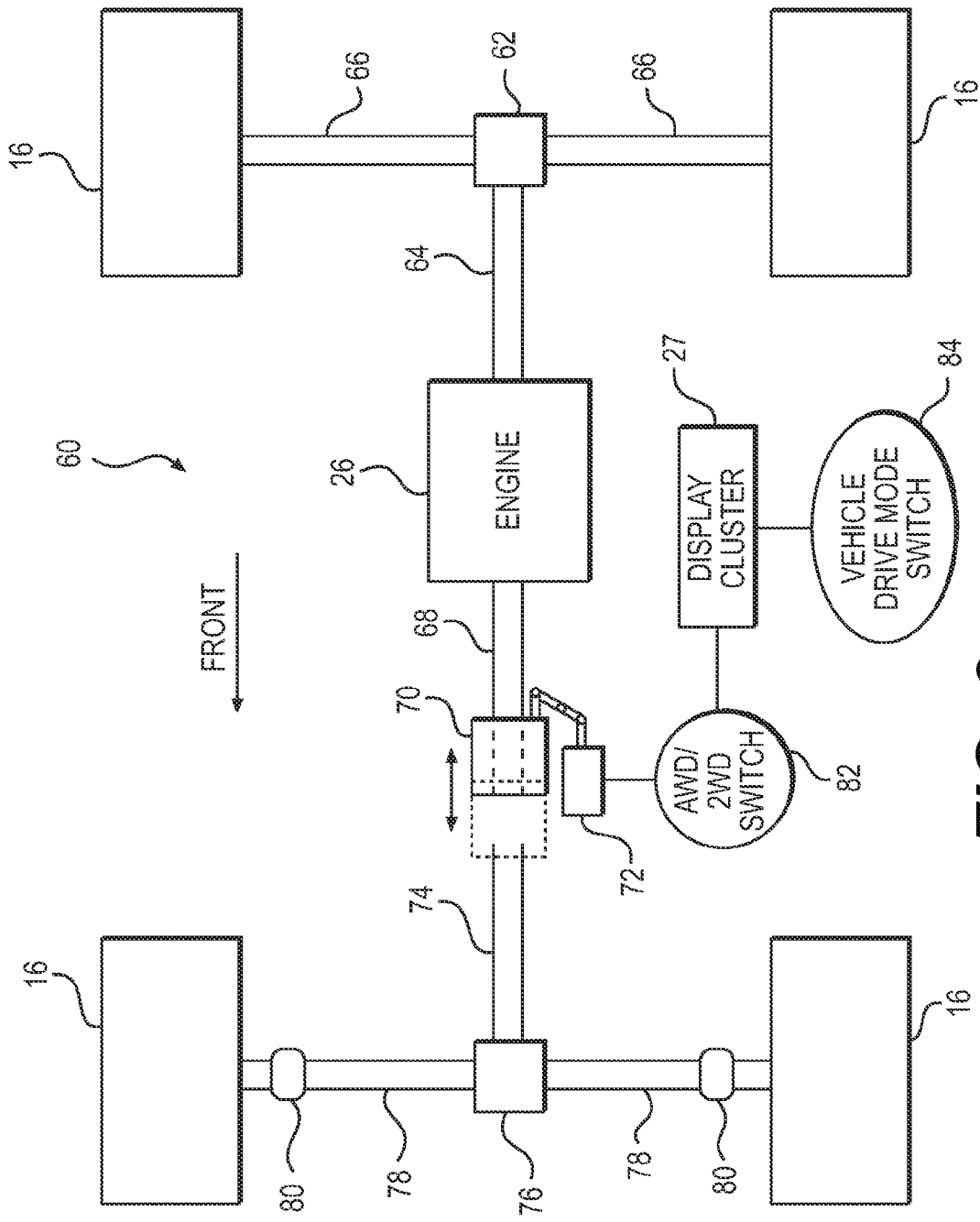
FIG. 3 is a schematic top view of a drive train of the ATV of FIG. 1.

FIG. 3 schematically illustrates a drivetrain 60 of the ATV 10. The engine 26, which preferably incorporates a transmission, is connected to a rear differential 62 via a rear propeller shaft 64 to transmit power from the engine 26 to the rear differential 62. Two half shafts 66 are connected between the rear differential 62 and the rear wheels 16 to transmit power from the rear differential 62 to the rear wheels 16. A first front propeller shaft 68 has one end connected to the front of the engine 26. The other end of the first front propeller shaft 68 is splined and has an internally splined coupling 70 slidably disposed thereon. The coupling 70 is connected to an actuator 72, in the form of a solenoid. The actuator 72 moves the coupling 70 between a first position (shown in dotted lines) where the coupling 70 engages the splined end of a second front propeller shaft 74 such that the first front propeller shaft 68 transmits power to the second front propeller shaft 74 and a second position (shown in solid lines) where the coupling 70 is disengaged from the second front propeller shaft 74 such that the first front propeller shaft 68 is disconnected from the second front propeller shaft 74 and no power is transmitted from one to the other. It is contemplated that other mechanisms could be used for selectively connecting the first and second front propeller shafts 68, 74, such as a clutch. For purposes of this application, these would also be considered to be a coupling. The second front propeller shaft 74 is connected to a front differential 76 to transmit power from the first front propeller shaft 68 to the front differential 76 when the coupling is in the first position described above. Two half shafts 78 are connected between the front differential 76 and the front wheels 16 to transmit power from the front differential 76 to the front wheels 16. Each half shaft 78 is provided with a constant velocity (CV) joint 80, also known as a homokinetic joint. The CV joints 80 allow power to be transmitted to the front wheels 16 without changes in rotational velocity even when the front wheels 16 are turned to steer the ATV 10. Each CV joint 80 could be made of two universal joints or could be a ball-type CV joint for example. Other types of joints are also contemplated.

When the coupling 70 is in the first position, the ATV 10 is operating in an all-wheel drive (AWD) mode, since all four wheels 16 are driven by the engine 26. When the coupling 70 is in the second position, the ATV 10 is operating in a two-wheel drive (2WD) mode, since only two of the wheels 16 are driven by the engine 26. More specifically, for the embodiment shown in FIG. 3, when the coupling is in the second position, the ATV 10 is operating in a rear-wheel drive (RWD) mode, since only the two rear wheels 16 are driven by the engine 26. It is contemplated that the arrangement of the drivetrain 60 shown in FIG. 3 could be reversed such that the front wheels 16 would constantly be driven by the engine 26 and the rear wheels 16 could be disconnected from the engine 26. In this reversed arrangement, when the coupling 70 is in the second position, the ATV 10 is operating in a front-wheel drive (FWD) mode, since only the two front wheels 16 are driven. The term 2WD will be used in this application when discussing aspects referring to either arrangement of the drivetrain 60, and the terms RWD and FWD will be used when discussing aspects referring to a specific arrangement of the drivetrain 60.

The actuator 72 is controlled via an AWD/2WD switch 82 electrically connected thereto. The AWD/2WD switch 82 is electrically connected to a vehicle drive mode switch 84 via the display cluster 27. The vehicle drive mode switch 84 is disposed on the handlebar 24 (see FIG. 4) so as to be easily accessible by the driver of the ATV 10. Alternatively the vehicle drive mode switch 84 could be disposed anywhere on the ATV 10 where it could be actuated by the driver of the ATV 10. In the RUV 31, the vehicle drive mode switch 84 could disposed on the steering wheel 46 or anywhere on the RUV 31 where it could be accessed by the driver of the RUV 31. The vehicle drive mode switch 84 could be in the form of a toggle switch, a selection dial, a button, an icon on a digital touch screen, or any other device permitting a selection to be made.

The driver of the ATV 10 selects the drive mode (AWD or 2WD) using the vehicle drive mode switch 84. The vehicle drive mode switch 84 sends a signal indicative of the selection to the display cluster 27, which then actuates the AWD/2WD switch 82 to move to a corresponding one of an AWD or a 2WD position, which results in the actuator 72 moving the coupling 70 to the position corresponding to the drive mode selected by the driver. It is contemplated that the vehicle drive mode switch 84 could be connected directly to the AWD/2WD switch 82. It is also contemplated that the AWD/2WD switch 82 could be omitted and that the vehicle drive mode switch 84 could be connected directly to the actuator 72 or via the cluster 27 to cause the actuator 72 to move the coupling to the position corresponding to the drive mode selected by the driver. It is also contemplated that the vehicle drive mode switch 84 could be omitted and that the AWD/2WD switch 82 could be automatically controlled to select the most appropriate drive mode without driver intervention.

Figure 4:
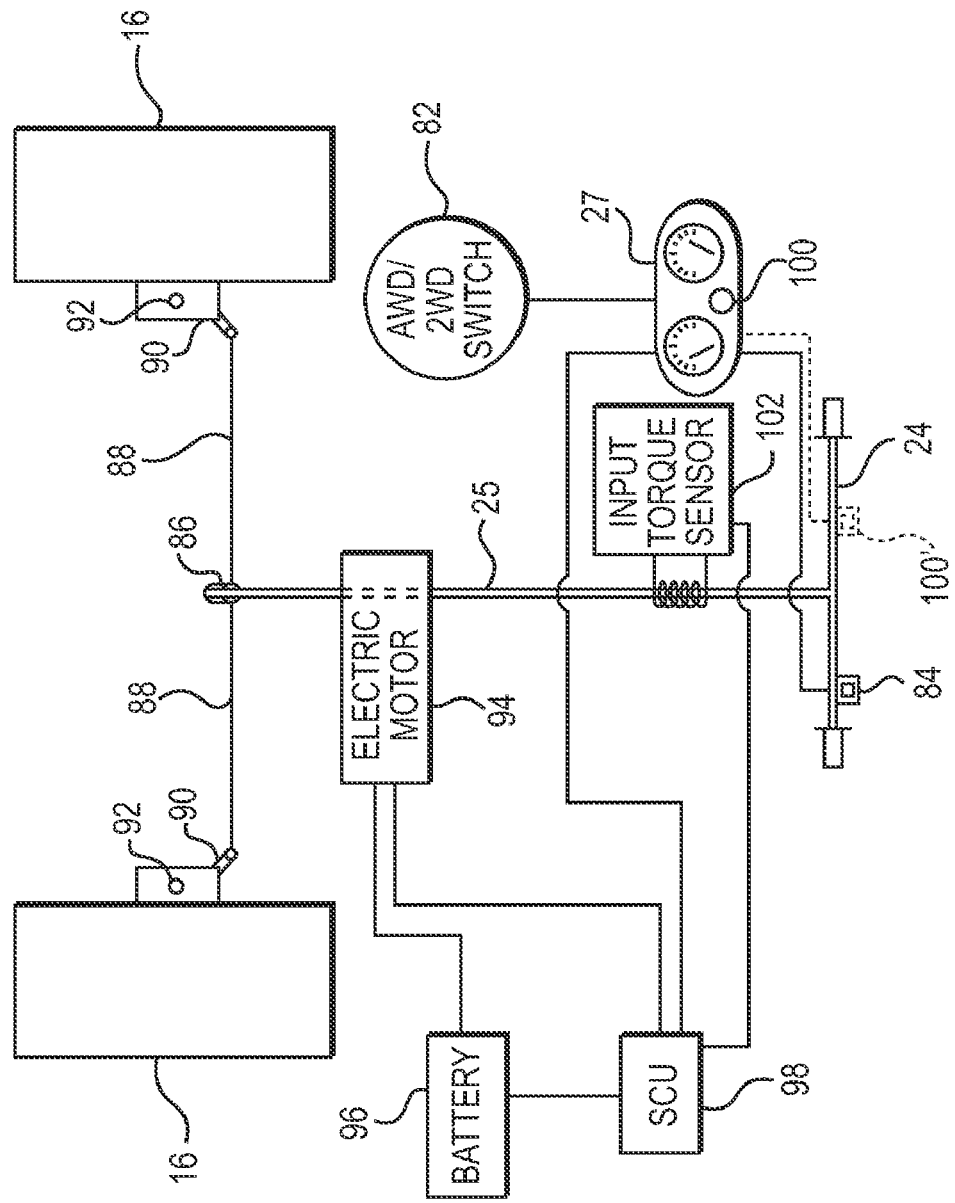
FIG. 4 is a schematic representation of a steering assembly and a power steering assembly of the ATV of FIG. 1.

The steering assembly and the power steering assembly of the ATV 10 will now be described with reference to FIG. 4. The steering assembly, as previously mentioned includes handlebar 24 and steering column 25. The steering assembly also includes a pitman arm 86, rods 88, and linkages 90. The pitman arm 86 is connected to the lower end of the steering column 25 and connects the steering column 25 to the linkages 90 via rods 88. The linkages 90 are connected to the front wheels 16 and are pivotable about axes 92. As would be understood, this assembly causes the front wheels 16 to turn in the direction in which the handlebar 24 is turned by the driver of the ATV 10. Other types of steering assemblies are contemplated, such as assemblies using a rack and pinion system.

The power steering assembly includes an electric motor 94, powered by a battery 96, and controlled by a steering control unit (SCU) 98. The electric motor 94 is operatively connected to the steering column 25 via gears (not shown) incorporated in the electric motor 94 or in a separate unit. The specific construction of the power steering assembly will not be described in detail herein since it is believed that power steering assemblies, and more specifically the connection of the electric motor 94 to the steering column 25, are well known to those skilled in the art and also since the specific construction will vary depending on the application and the construction of the vehicle. Two examples of power steering assemblies are shown and described in U.S. Pat. No. 6,499,559 B2, issued Dec. 31, 2002, and U.S. Pat. No. 7,216,733 B2, issued May 15, 2007, both of which are incorporated herein by reference in their entirety.

When power is applied to the electric motor 94, the electric motor 94 applies torque to the steering column 25, thereby assisting in the steering of the ATV 10 (i.e. it makes it easier to steer). The more power is applied to the electric motor 94, the more torque is applied to the steering column 25, the more assist is provide by the power steering assembly. The SCU 98 controls the power being applied to the electric motor 94 by using one of a plurality of steering maps, such as those shown in FIG. 8A to 8D, as described in greater detail below. To determine which of the steering maps is to be used, the SCU 98 determines the drive mode (AWD or 2WD) of the ATV 10 and a steering mode (defined below) selected by the driver of the ATV 10. Once the drive mode and the steering mode are determined, the SCU 98 selects the corresponding steering map, as described in greater detail below. In some aspects, the SCU 98 also determines the output from one of the load sensors, more specifically the passenger presence sensor 23, to determine which of the steering maps is to be used, as also described in greater detail below.

To determine the drive mode, the SCU 98 reads a position of the AWD/2WD switch 82 via the display cluster 27.

The steering mode corresponds to one of two modes selected by the driver of the ATV 10, one of the modes providing more steering assist than the other. For purposes of this application, the two modes are a touring mode, more suitable for situations where the ATV 10 may have to make sharp turns, and a sport mode, where it is less likely that sharp turns will have to be made. As such, selecting the touring mode will cause the SCU 98 to control the electric motor 94 to generate more output torque than when in the sport mode, as described in greater detail below. It should be understood however that the specific reason or function for each mode could vary, and that one mode simply provides more steering assistance than the other. For example, a vehicle could have as its steering modes a "normal" driving mode and a "parking" mode, the parking mode providing more steering assistance than the normal driving mode. It is contemplated that there could be more than two steering modes, each providing a different level of steering assistance.

The driver of the ATV 10 selects the steering mode by using a steering mode control switch 100 located on the display cluster 27. The display cluster 27 then sends a signal indicative of the selected steering mode to the SCU 98. The steering mode control switch 100 is a button which switches from the currently selected steering mode to the other steering mode when held for a short period of time (i.e. a few seconds so as to avoid unintentional switching). Alternatively, the steering mode control switch could be in the form of a toggle switch, a selection dial, an icon on a digital touch screen, or any other device permitting a selection to be made. It is also contemplated that the steering mode control switch 100 could be disposed anywhere else on the ATV 10 where it could be actuated by the driver of the ATV 10. For example, the steering mode control switch 100 could be located on the handlebar 24 and be electrically connected to the display cluster 27 (see switch 100' in FIG. 4). It is also contemplated that the steering mode control switch 100 could have multiple functions depending on an operating condition of the ATV 10. For example, the steering model control switch 100 could be used to select the steering mode as describe above when the transmission of the ATV 10 is the neutral, park, or forward position, and could actuate an overdrive function (which increases the RPM limit of the engine 26) when the transmission of the ATV 10 is in the reverse position.

Once the SCU 98 has selected the steering map, the SCU 98 uses the selected steering map to determine the output torque to be applied by the electric motor 94 that corresponds to a torque applied to the steering column 25 by the driver of the ATV 10. The torque applied to the steering column 25 by the driver of the ATV (i.e. the input torque) is measured by an input torque sensor 102 connected to the steering column 25. The input torque sensor 102 is electrically connected to the SCU 98 to send a signal indicative of the input torque to the SCU 98. The output torque determination process will be described in greater detail below.

Figure 5A:
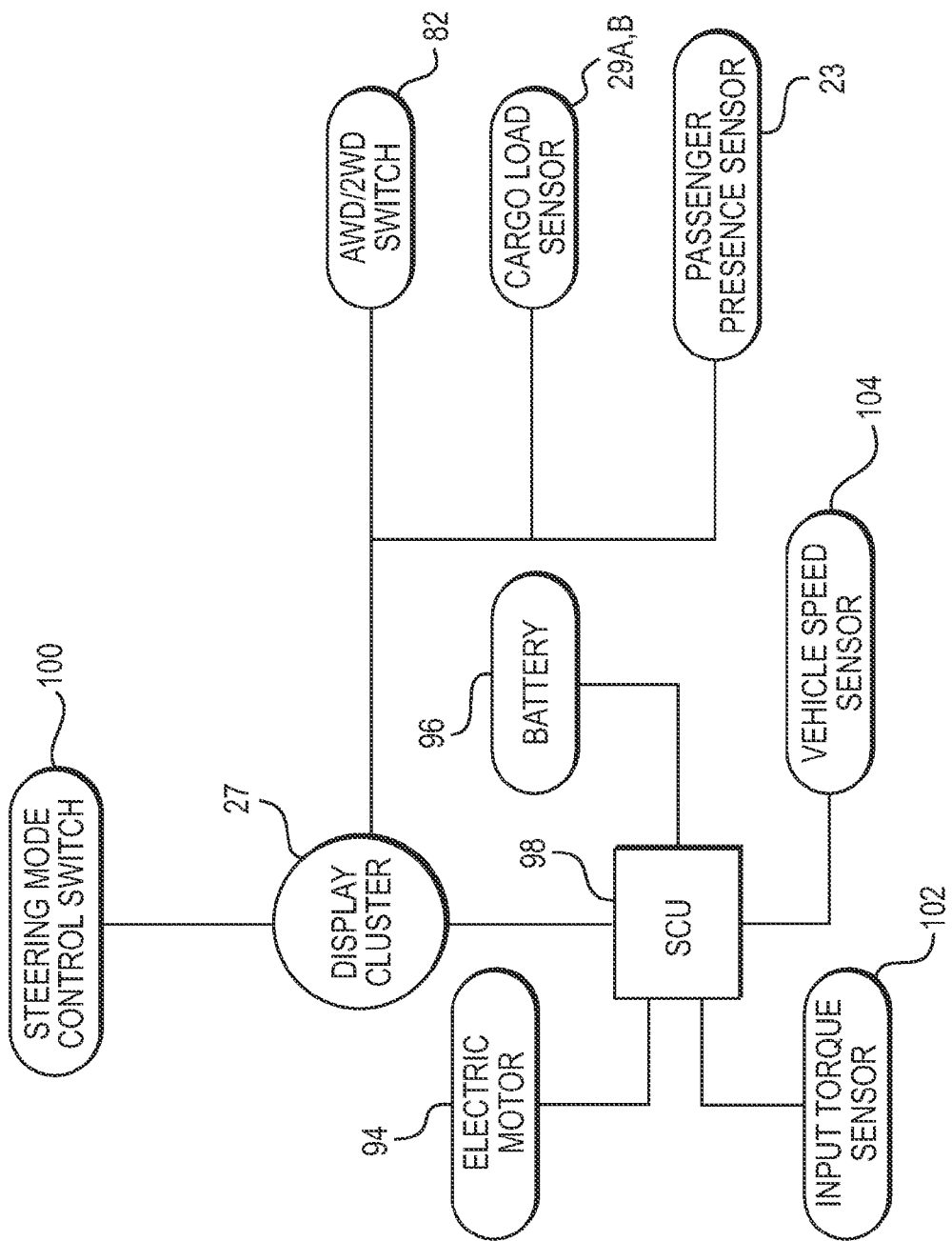
FIG. 5A is a schematic representation of an embodiment of portions of an electrical system of the ATV of FIG. 1.

Turning now to FIG. 5A, portions of the electrical system of the ATV 10 related to the power steering assembly will be described. As previously mentioned, the SCU 98 uses various inputs, the effects of which will be discussed in greater detail below, to determine the output torque to be applied to the steering column 25 by the electric motor 94. The SCU 98 is electrically connected to battery 96 to determine a voltage thereof, to the input torque sensor 102 to receive a signal indicative of the torque applied to the steering column 25 by the driver as previously mentioned, and to a vehicle speed sensor 104 to receive a signal indicative of the vehicle speed. The SCU 98 is also electrically connected to the display cluster 27 to receive various inputs therefrom by using, for example, a CAN serial bus. The display cluster 27 is electrically connected to and receives inputs from the passenger presence sensor 23, the cargo load sensors 29A, 29B, the AWD/2WD switch 82, and the steering mode control switch 100. The display cluster 27 then sends signals to the SCU 98 indicative of these inputs. The passenger presence sensor 23 is a load sensor, which as the name indicates, provides a signal indicative of the presence of a passenger (in addition to the driver) on the ATV 10. The cargo load sensors 29A, 29B respectively provide a signal indicative of the load on the cargo box 28 and the cargo rack 30. The AWD/2WD switch 82 provides a signal indicative of the drive mode of the ATV 10 as previously described. Alternatively, it is contemplated that the signal indicative of the drive mode of the ATV 10 could be provided by the vehicle drive mode switch 84 or by a sensor sensing a position of the coupling 70. The steering mode control switch 100 provides a signal indicative of the steering mode selected by the driver of the ATV 10 as previously described.

Figure 5B:
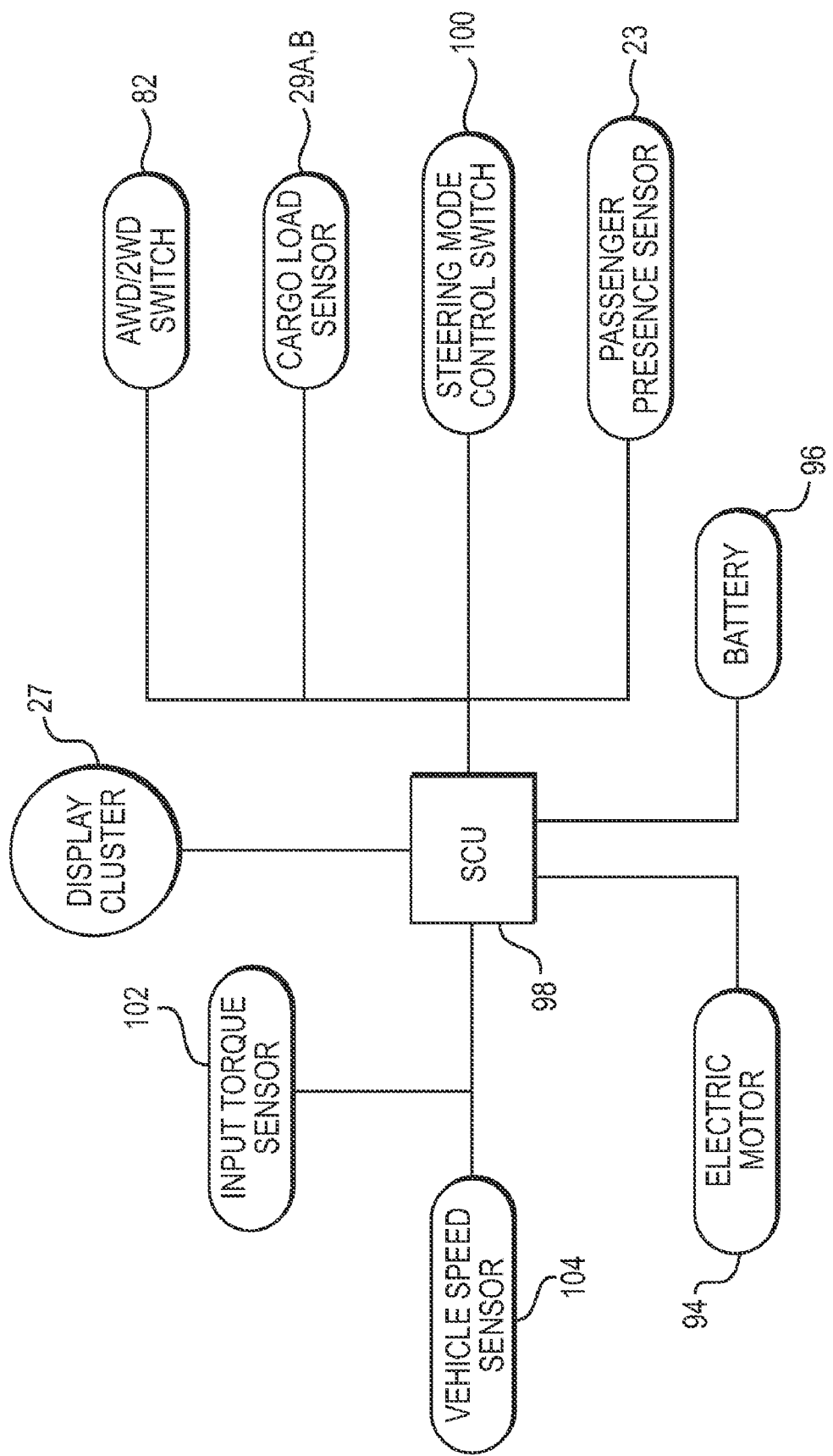
FIG. 5B is a schematic representation of an alternative embodiment of portions of an electrical system of the ATV of FIG. 1.

In an alternative embodiment illustrated in FIG. 5B, the passenger presence sensor 23, the cargo load sensors 29A, 29B, the AWD/2WD switch 82, and the steering mode control switch 100 are connected directly to the SCU 98.

It is contemplated that at least some of the various switches, sensors, and components described above could be electrically connected to the SCU 98 via another component of the ATV 10. For example, the vehicle speed sensor 104 could be connected to an engine control module (ECM) (not shown) used to control the engine 26 that is electrically connected to the SCU 98. In such a case, the ECM would receive the signal indicative of the vehicle speed from the vehicle speed sensor 104 and relay it to the SCU 98. It is also contemplated that the functions of the SCU 98 could be integrated into a control unit or module used to control other aspects of the ATV 10, such as the ECM.

Turning now to FIGS. 6 to 8D, the determination of the output torque and the control of the electric motor 94 will be described in greater detail.

Figure 6:
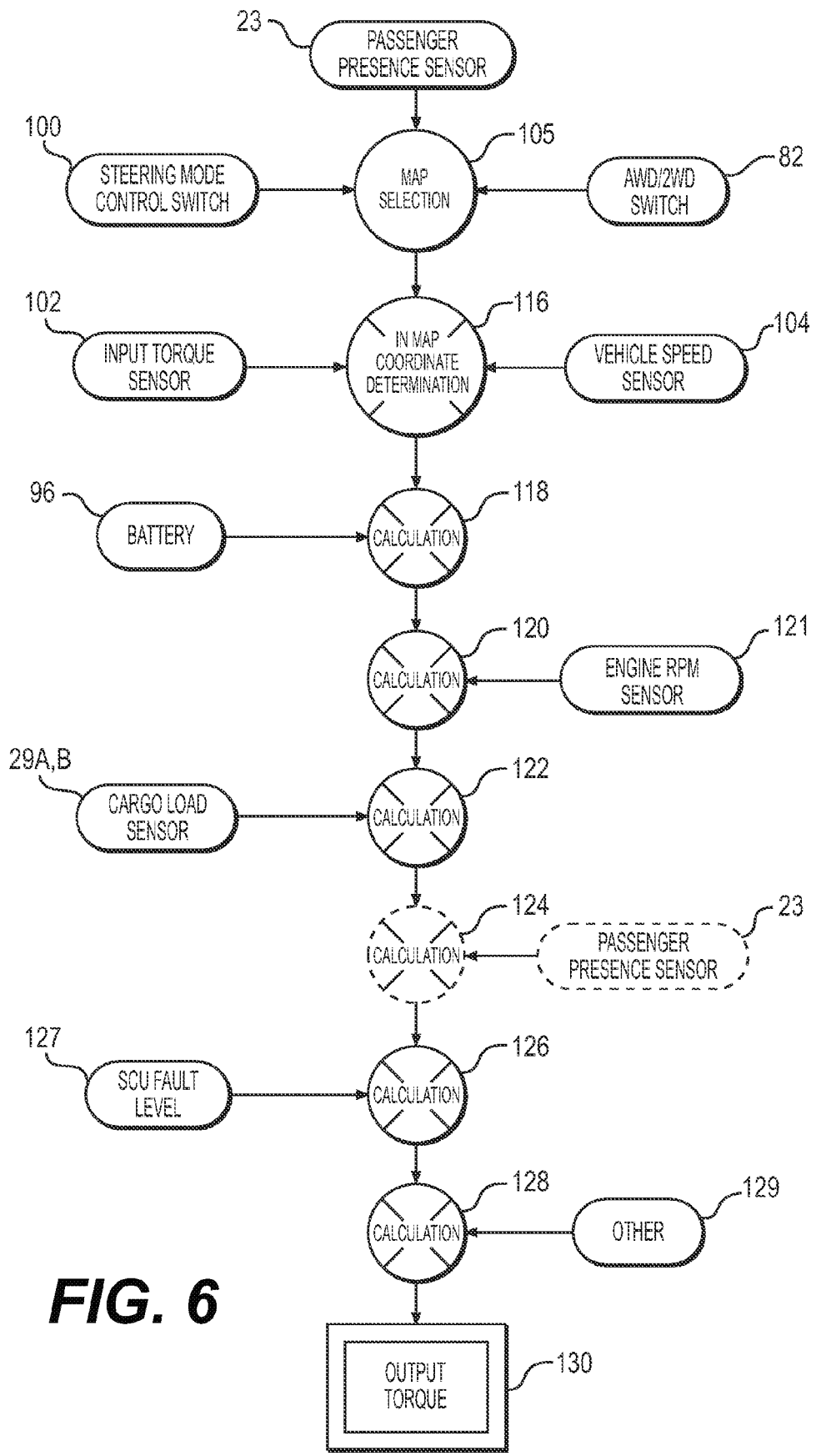
FIG. 6 is a schematic representation of an output torque determination process in accordance with aspects of the present invention.
Figure 7:
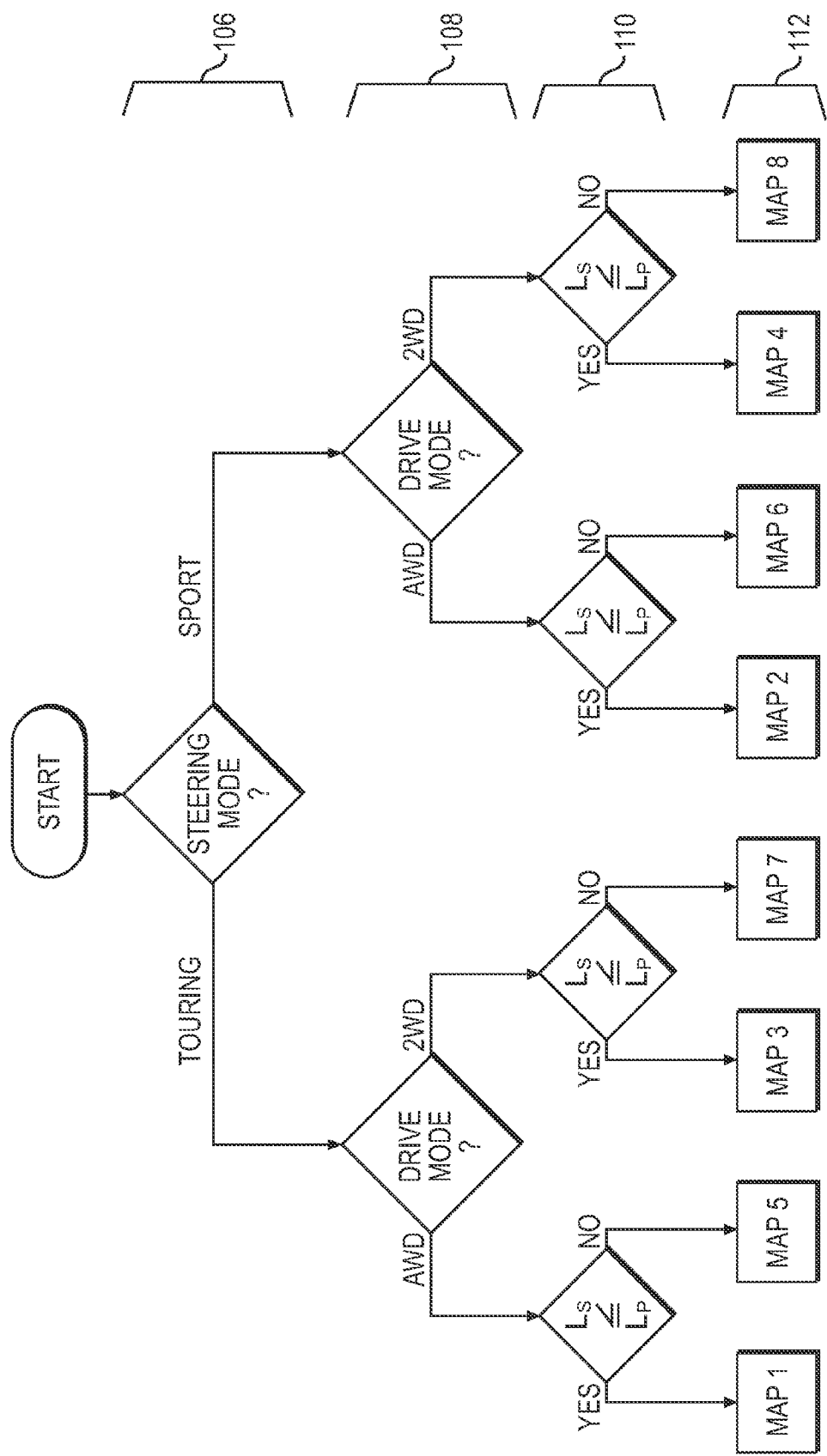
FIG. 7 is a logic diagram illustrating a steering map selection process in accordance with aspects of the present invention.

FIG. 6 illustrates the process by which the SCU 98 determines the output torque to be applied by the electric motor 94. The first step 105 is to determine the steering map to be used. The SCU 98 receives inputs from the AWD/2WD switch 82, the steering mode control switch 100, and the passenger presence sensor 23. The process for performing this step 105 is illustrated in FIG. 7. As seen in FIG. 7, the SCU 98 first determines, at step 106, whether the driver has selected the touring mode or sport mode of steering. Then at step 108, the SCU 98 determines if the ATV is operating in AWD mode or 2WD mode. Then at step 110, the SCU 98 determines if the load sensed (Ls) by the passenger presence sensor 23 is less than equal to a predetermined load (Lp). The predetermined load is a load above which more steering assistance needs to be provided due to the added weight. It is contemplated that the predetermined load could be zero or relatively small such that a different map is selected if a passenger is present regardless of their weight. In such a case, the passenger presence sensor 23 can be in the form of a simple contact switch. It is also contemplated that one of the other load sensors 29A, B could be used instead of or in addition to the passenger presence sensor 23 in the map selection process. As can be seen at 112, since each input has two possible values, the SCU 98 selects one of eight steering maps based on the previous steps. It is contemplated that more than eight steering maps could be provided. For example, if there are three steering modes to choose from at step 106, then there would be twelve steering maps. It is also contemplated that more inputs could be provided for making the steering map selection process, which would result in additional steering maps as would be understood. It is also contemplated that the order of steps 106 to 110 could be different from what is illustrated in FIG. 7.

Figure 8B:
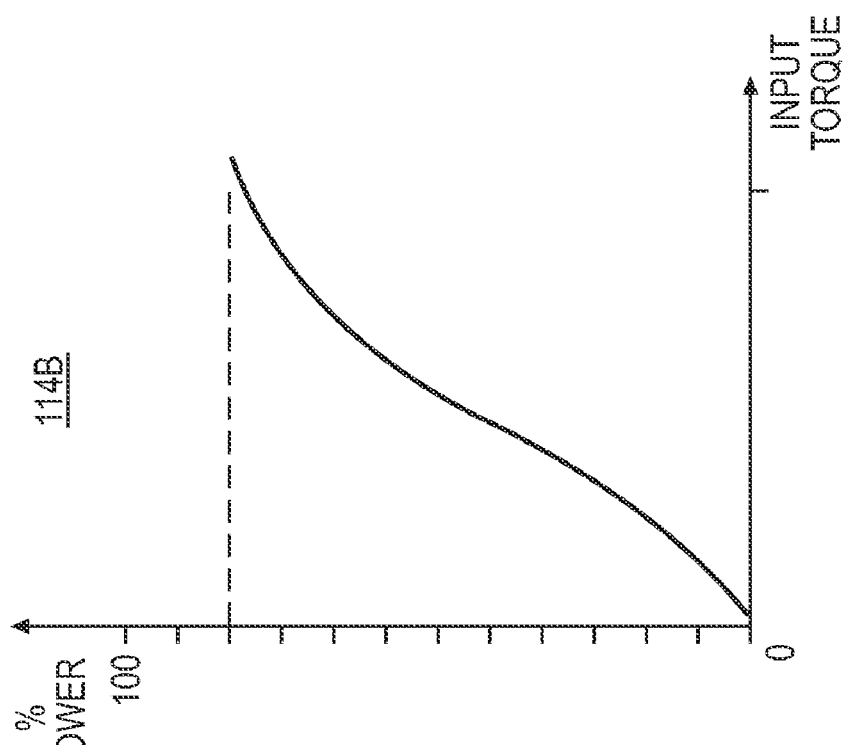
FIGS. 8A to 8D illustrate four steering maps in accordance with aspects of the present invention.
Figure 8A:
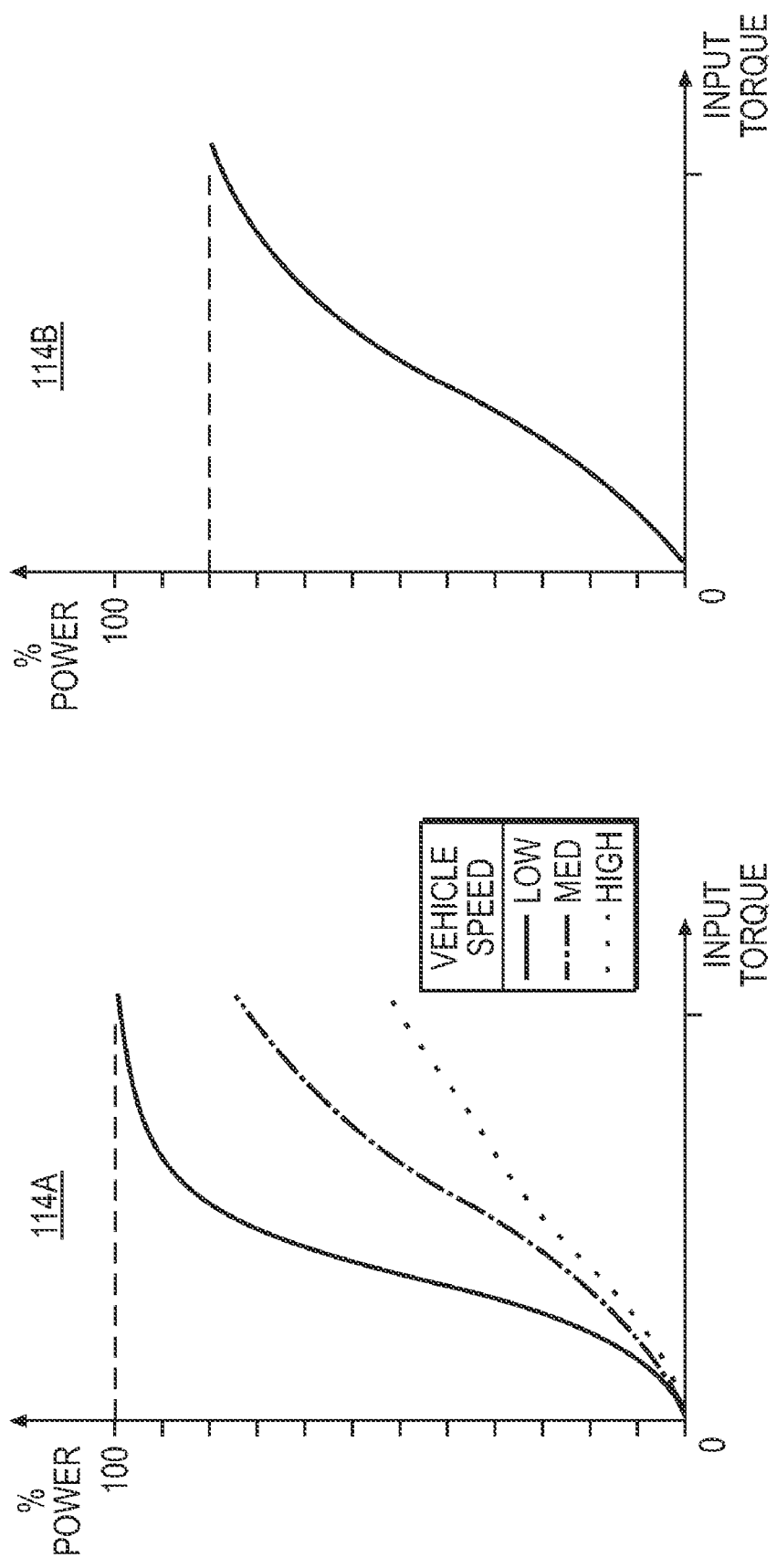
Figures 8C, 8D:
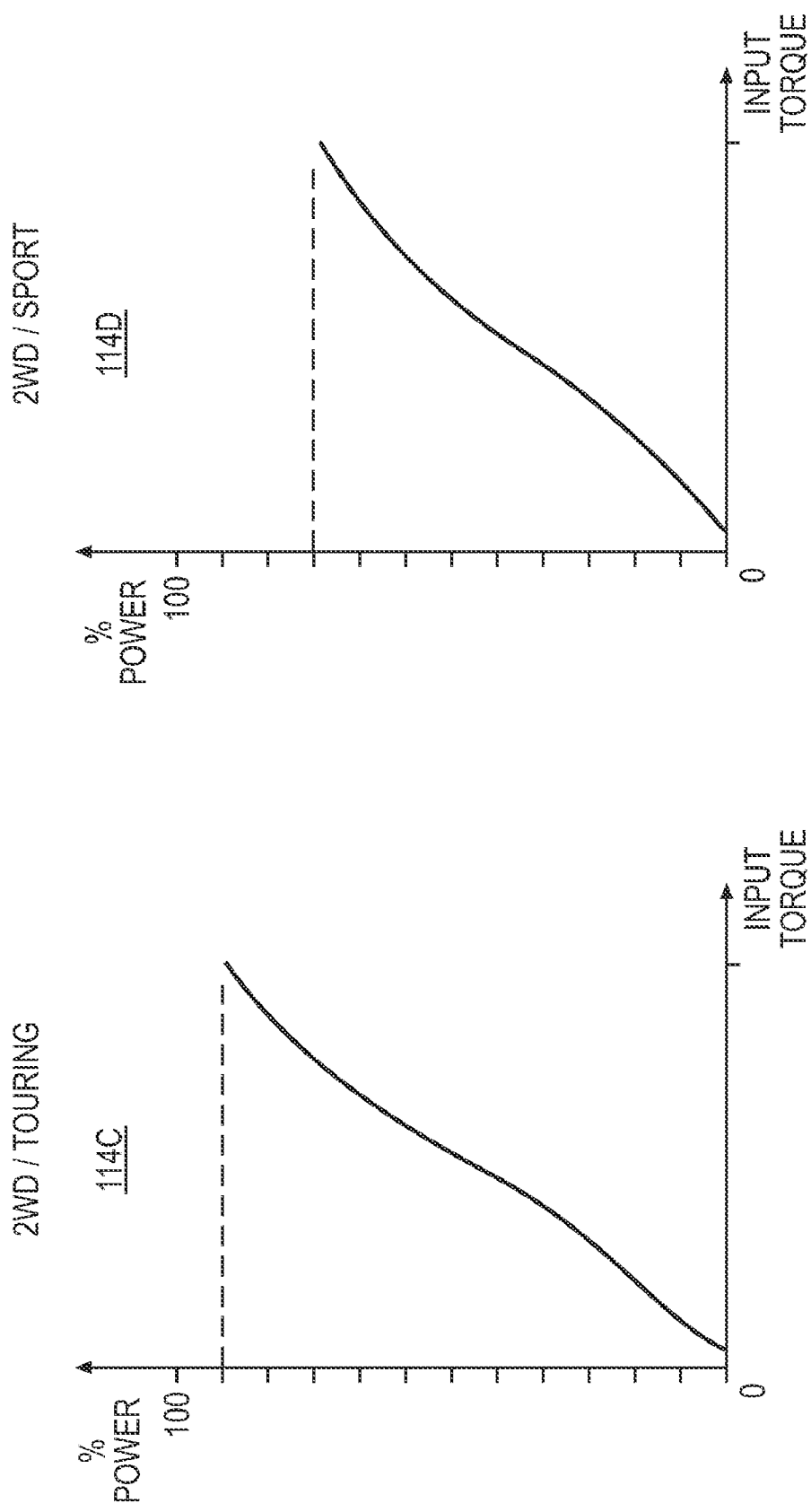

In an alternative embodiment, the SCU 98 only uses inputs from the AWD/2WD switch 82 and the steering mode control switch 100 to determine the steering map to be used at step 105. As such, the SCU 98 selects one of four steering maps (114A to 114D) illustrated in FIGS. 8A to 8D. Steering map 114A, shown in FIG. 8A, is selected when the ATV 10 is operating in the AWD mode and the touring mode is selected. Steering map 114B, shown in FIG. 8B, is selected when the ATV 10 is operating in the AWD mode and the sport mode is selected. Steering map 114C, shown in FIG. 8C, is selected when the ATV 10 is operating in the 2WD mode and the touring mode is selected. Steering map 114D, shown in FIG. 8D, is selected when the ATV 10 is operating in the 2WD mode and the sport mode is selected.

Turning back to FIG. 6, once the steering map has been selected at step 105, the SCU then determines an output torque to be applied by the electric motor 94 at step 116 using the selected steering map. The SCU 98 uses inputs from the input torque sensor 102 and the vehicle speed sensor 104 to make this determination. As can be seen in FIGS. 8A to 8D, the horizontal axis of each steering map 114A to 114D corresponds to the input torque (i.e. the torque applied to the steering assembly by the driver of the ATV 10), and the vertical axis corresponds to the percentage of electrical power to be applied by the SCU 98 to the electric motor (% power). The SCU 98 applies electric power to the electric motor 94 using a pulse width modulator (not shown). Other ways of controlling the power applied to the electric motor 94 are also contemplated. As such, the percentage of power corresponds to the percentage of time power is applied for a given pulse. For example, 60% power means that for the given pulse, power is applied 60% of the time and no power is applied for the remaining 40%. As would be understood by those skilled in the art, the greater the percentage of power to be applied is, the greater the output torque applied to by the electric motor 94 will be. Due to this relationship between the percentage of power to be applied and the output torque applied by the electric motor 94, the percentage of power will sometimes be referred to as the output torque for simplicity.

Although only shown in FIG. 8A for simplicity, each steering map includes multiple curves, each corresponding to a different vehicle speed. The SCU 98 determines which speed curve is to be used from the speed sensed by the vehicle speed sensor 104 and determines the percentage of power to be applied that corresponds to the sensed input torque on that speed curve. In case no speed curve corresponds to the speed sensed by the vehicle speed sensor 104, the SCU 98 will determine the percentage of power to be applied on the two speed curves between which the sensed speed is located and will then interpolate the percentage of power to be applied from these values. As can be seen, the percentage of power applied increases as the input torque increases, and therefore the output torque applied by the electric motor 94 increases as the input torque increases. As can be seen in FIG. 8A, as the speed of the vehicle increases, the percentage of power applied (and therefore the output torque) decreases. It is contemplated that each steering map could be provided with curves corresponding to various vehicle speeds for when the vehicle is operating in reverse. In such a case, for an identical input torque and for the same vehicle speed in the reverse and forward directions, the output torque would be lower when the vehicle is moving in the reverse direction than when the vehicle is moving in the forward direction.

By comparing the low speed curve (solid line) on each of the steering maps 114A to 114D, it can be seen that for an identical input torque and for a given drive mode (AWD or 2WD), the touring mode results in more output torque to be applied than the sport mode (see 114A vs 114B and 114C vs 114D) for most input torques. It can also be seen that for an identical input torque and for a given steering mode (touring or sport), the AWD mode results in more output torque to be applied than the 2WD mode (see 114A vs 114C and 114B vs 114D) for most input torques. In a preferred embodiment, the steering maps are made such that for a given steering mode, a driver of the ATV 10 will not feel a difference in the steering of the ATV 10 when switching from one drive mode to the other (for example from AWD to 2WD) due to the different torque outputs resulting from the change in steering maps. It is contemplated that each map could have at least one speed curve which, for an identical input torque, results in the same output torque being applied in each of the steering maps 114A to 114D for most input torques. For example, at very low speeds the resulting output torque being applied for a given input torque could be the same regardless of which of the steering maps 114A to 114D is being used. In such a case, the resulting output torque being applied for a given input torque (for most input torques) would be different for each steering map over a range of speeds, but not all speeds.

Turning back to FIG. 6, it is contemplated that the output torque determination process could end at step 116 and move directly to step 130 described below, however in order to take into account other factors which may affect the performance of the power steering assembly and of the ATV 10, the SCU 98 performs some adjustment calculations to the output torque determined from the steering maps. Some of these calculations will be explained below. However, it should be understood that more or fewer calculations could be made.

At step 118, the SCU 118 receives an input corresponding to the voltage of the battery 96. If the voltage of the battery 96 is low, the SCU 98 reduces the output torque to be applied by the electric motor 94. In one contemplated embodiment, the SCU 98 reduces the output torque to be applied by the electric motor 94 by a first percentage when the voltage of the battery 96 is in a first range, the SCU 98 reduces the output torque to be applied by the electric motor 94 by a second percentage greater than the first range when the voltage of the battery 96 is in a second range lower the first range, and the SCU 98 reduces the output torque to be applied by the electric motor 94 by a third percentage greater than the second range when the voltage of the battery 96 is in a third range lower than the second range. It is contemplated that there could be more or fewer such voltage ranges, with the percentage of reduction of output torque increasing as the battery voltage in the voltage ranges decreases. Other ways of determining the amount of reduction of output torque to be applied by the electric motor 94 are also contemplated. For example, the relationship between the percentage of reduction of output torque to be applied by the electric motor 94 and the voltage of the battery 96 could be linear, with the percentage of reduction of output torque to be applied by the electric motor 94 increasing as the voltage of the battery 96 decreases. It is contemplated that the relationship between the percentage of reduction of output torque to be applied by the electric motor 94 and the voltage of the battery 96 could be stored in one or more lookup maps in the SCU 98. This ensures that other systems more essential to the operation of the ATV 10 than the power steering assembly will get the power necessary to operate them.

At step 120, the SCU 98 receives an input indicative of engine speed from an engine speed sensor 121. If the engine speed is too low, the SCU 98 will not cause the electric motor 94 to apply any output torque.

At step 122, the SCU 98 receives inputs from the cargo load sensors 29A and 29B. A load located forwardly of the center of gravity of the ATV 10 (i.e. as sensed by sensor 29B) results in the SCU 98 increasing the output torque applied by the electric motor 94 since more load is applied to the front wheels 16 which are the ones being steered. A load located rearwardly of the center of gravity of the ATV 10 (i.e. as sensed by sensor 29A) results in the SCU 98 decreasing the output torque applied by the electric motor 94 since this reduces the load applied to the front wheels 16.

Step 124 (shown in phantom) occurs in the previously described embodiment where the input from the passenger presence sensor 23 is not taken into account in the steering map selection process at step 105. At step 124, if the input from the passenger presence sensor 23 indicates that a passenger is present, the SCU 98 changes the output torque to be applied by the electric motor 94. If the load applied by the passenger is disposed forwardly of the center of gravity of the ATV 10, then the SCU 98 increases the output torque. If the load applied by the passenger is disposed rearwardly of the center of gravity of the ATV 10, then the SCU 98 decreases the output torque. Whether the output torque is increased or decreased depends on the specific construction of the vehicle and the location of the passenger seating location on the vehicle. This change in output torque could be a constant when the passenger presence sensor 23 simply senses if a passenger is present or not, or it could vary when the passenger presence sensor 23 senses the weight of the passenger (i.e. the heavier the passenger, the greater the change in output torque).

At step 126, the SCU 98 reads an SCU fault level 127 to determine if any fault exist within the SCU 98 which might indicate a malfunction of the SCU 98. Examples of such faults are SCU overheating and high current levels. If any such fault exists, the SCU 98 may reduce the output torque to be applied by the electric motor 94 or to apply a default output torque depending on the fault.

At step 128, the SCU 98 makes any adjustments to the output torque to be applied which may be necessary based on other inputs 129. These other inputs could include, but are not limited to, steering position and throttle lever position. It is also contemplated that an output torque feedback circuit could be used to determine if the actual output torque applied by the electric motor 94 corresponds to the output torque that was calculated.

It is contemplated that the order of steps 118 to 128 could be different from the order illustrated in FIG. 6.

Finally at step 130, the final output torque to be applied by the electric motor 94 is known, and the SCU 98 controls the electric power applied to the electric motor 94 such that the electric motor 98 applies that torque to the steering assembly.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
a frame;
two front wheels suspended from the frame, each of the two front wheels including a tire;
at least one rear wheel suspended from the frame, the at least one rear wheel including a tire;
at least one seat mounted on the frame;
a steering assembly disposed forwardly of the at least one seat and being operatively connected to the two front wheels;
an engine mounted to the frame, the engine being operatively connected to the at least one rear wheel, and the engine being selectively operatively connectable to the two front wheels, the vehicle operating in an all-wheel drive (AWD) mode when the engine is operatively connected to the two front wheels and the at least one rear wheel, and the vehicle operating in a rear-wheel drive (RWD) mode when the engine is operatively connected to the at least one rear wheel and is disconnected from the two front wheels;
an electric motor operatively connected to the steering assembly for assisting the steering of the vehicle;
an input torque sensor operatively connected to the steering assembly for sensing a torque applied to the steering assembly by a user of the vehicle;
a steering control unit electrically connected to the electric motor and the input torque sensor; and
a steering mode control switch for selecting between a first steering mode and a second steering mode, the steering mode control switch being electrically connected to the steering control unit,
the steering control unit selecting one of a first steering map, a second steering map, a third steering map, and a fourth steering map based on the drive mode (AWD or RWD) of the vehicle and the one of the first and second steering modes selected by the steering mode control switch,
the first steering map being selected when the vehicle is operating in the AWD mode and the first steering mode is selected,
the second steering map being selected when the vehicle is operating in the AWD mode and the second steering mode is selected,
the third steering map being selected when the vehicle is operating in the RWD mode and the first steering mode is selected,
the fourth steering map being selected when the vehicle is operating in the RWD mode and the second steering mode is selected,
the steering control unit determining an output torque corresponding to the torque sensed by the input torque sensor using the selected one of the first, second, third, and fourth steering maps, and the steering control unit controlling the electric motor to apply the corresponding output torque to the steering assembly.

2. The vehicle of claim 1, wherein for a given speed within a range of vehicle speeds and for an identical torque sensed by the input torque sensor:
the corresponding output torque in the first steering map is greater than in the second steering map,
the corresponding output torque in the third steering map is greater than in the fourth steering map,
the corresponding output torque in the first steering map is greater than in the third steering map, and
the corresponding output torque in the second steering map is greater than in the fourth steering map.

3. The vehicle of claim 1, further comprising:
a coupling movable between a first position and a second position, the first position operatively connecting the engine to the two front wheels, the second position disconnecting the engine from the two front wheels;
an actuator operatively connected to the coupling for moving the coupling between the first and second position; and
a vehicle drive mode switch for selecting between the AWD mode and the RWD mode, the vehicle drive mode switch being electrically connected to the actuator such that the actuator moves the coupling to the first position when the AWD mode is selected by the vehicle drive mode switch and moves the coupling to the second position when the RWD mode is selected by the vehicle drive mode switch.

4. The vehicle of claim 3, further comprising an AWD/RWD switch electrically connected to the actuator, the vehicle drive mode switch, and the steering control unit;
wherein the AWD/RWD switch moves to an AWD position when the AWD mode is selected by the vehicle drive mode switch, the AWD/RWD switch thereby causing the actuator to move the coupling to the first position;
wherein the AWD/RWD switch moves to an RWD position when the RWD mode is selected by the vehicle drive mode switch, the AWD/RWD switch thereby causing the actuator to move the coupling to the second position;
wherein the steering control unit determines the drive mode of the vehicle based on a position of the AWD/RWD switch.

5. The vehicle of claim 3, further comprising a display cluster disposed forwardly of the at least one seat, the display cluster being electrically connected to the steering control unit; and
wherein the vehicle drive mode switch and the steering mode control switch are electrically connected to the steering control unit via the display cluster.

6. The vehicle of claim 3, wherein the steering assembly includes a handlebar; and
wherein the vehicle drive mode switch is disposed on the handlebar.

7. The vehicle of claim 6, wherein the steering mode control switch is disposed on the handlebar.

8. The vehicle of claim 1, further comprising a vehicle speed sensor for sensing a speed of the vehicle, the vehicle speed sensor being electrically connected to the steering control unit; and
wherein for each of the first, second, third, and fourth steering maps, the corresponding output torque decreases as the speed of the vehicle increases.

9. The vehicle of claim 1, further comprising a battery electrically connected to the electric motor; and
wherein the steering control unit controls the electric motor to apply a reduced output torque to the steering assembly when a voltage of the battery is below a predetermined voltage, the reduced output torque being less than the corresponding output torque.

10. The vehicle of claim 1, further comprising at least one load sensor for sensing a load applied to the vehicle, the at least one load sensor being electrically connected to the steering control unit; and
wherein the steering control unit controls the electric motor to apply an adjusted output torque to the steering assembly, the adjusted output torque being calculated based on at least the corresponding output torque and the load sensed by the at least one load sensor.

11. The vehicle of claim 10, wherein the at least one load sensor includes a passenger presence sensor and a cargo load sensor, the passenger presence sensor being positioned under the at least one seat, and the cargo load sensor being positioned under a cargo receiving space of the vehicle.

12. The vehicle of claim 1, further comprising at least one load sensor for sensing a load applied to the vehicle, the at least one load sensor being electrically connected to the steering control unit;
wherein the steering control unit selects one of the first steering map, the second steering map, the third steering map, the fourth steering map, a fifth steering map, a sixth steering map, a seventh steering map, and an eighth steering map based on the drive mode of the vehicle, the one of the first and second steering modes selected by the steering mode control switch, and a load sensed by the at least one load sensor,
one of the first, second, third, and fourth steering maps being selected when the load sensed by the at least one load sensor is less than or equal to a predetermined load,
the fifth steering map being selected when the vehicle is operating in the AWD mode, the first steering mode is selected, and the load sensed by the at least one load sensor is greater than the predetermined load,
the sixth steering map being selected when the vehicle is operating in the AWD mode, the second steering mode is selected, and the load sensed by the at least one load sensor is greater than the predetermined load,
the seventh steering map being selected when the vehicle is operating in the RWD mode, the first steering mode is selected, and the load sensed by the at least one load sensor is greater than the predetermined load,
the eighth steering map being selected when the vehicle is operating in the RWD mode, the second steering mode is selected, and the load sensed by the at least one load sensor is greater than the predetermined load, and
the steering control unit determining an output torque corresponding to the torque sensed by the input torque sensor using the selected one of the first, second, third, fourth, fifth, sixth, seventh, and eighth steering maps.

13. A method of controlling a power steering assembly of a vehicle, the power steering assembly including an electric motor operatively connected to a steering assembly of the vehicle, the method comprising:
determining whether the vehicle is operating in an all-wheel drive (AWD) mode or a two-wheel drive (2WD) mode;
selecting one of a first steering mode and a second steering mode;
selecting a first steering map when the vehicle operates in the AWD mode and the first steering mode is selected;

selecting a second steering map when the vehicle operates in the AWD mode and the second steering mode is selected;

selecting a third steering map when the vehicle operates in the 2WD mode and the first steering mode is selected;

selecting a fourth steering map when the vehicle operates in the 2WD mode and the second steering mode is selected;

sensing a torque applied to the steering assembly by a driver of the vehicle;

determining an output torque corresponding to the torque applied to the steering assembly by the driver of the vehicle using the selected one of the first, second, third, and fourth steering maps; and controlling the electric motor to apply the corresponding output torque to the steering assembly.

14. The method of claim 13, wherein for a given speed within a range of vehicle speeds and for an identical torque applied to the steering assembly by the driver of the vehicle:

the corresponding output torque in the first steering map is greater than in the second steering map, the corresponding output torque in the third steering map is greater than in the fourth steering map, the corresponding output torque in the first steering map is greater than in the third steering map, and the corresponding output torque in the second steering map is greater than in the fourth steering map.

15. The method of claim 13, further comprising selecting one of the AWD mode and the 2WD mode.

16. The method of claim 13, further comprising sensing a speed of the vehicle; and wherein for each of the first, second, third, and fourth steering maps, the corresponding output torque decreases as the speed of the vehicle increases.

17. The method of claim 13, further comprising sensing a voltage of a battery powering the electric motor; and wherein controlling the electric motor to apply the corresponding output torque to the steering assembly includes controlling the electric motor to apply a reduced output torque to the steering assembly when the voltage of the battery is below a predetermined voltage, the reduced output torque being less than the corresponding output torque.

18. The method of claim 13, further comprising sensing a load applied to the vehicle; and wherein controlling the electric motor to apply the corresponding output torque to the steering assembly includes controlling the electric motor to apply an adjusted output torque to the steering assembly, the adjusted output torque being calculated based at least the corresponding output torque and the sensed load.

19. The method of claim 18, wherein sensing a load applied to the vehicle includes:

sensing a load applied to at least one seat of the vehicle; and sensing a load applied to a cargo receiving space of the vehicle.

20. The method of claim 13, further comprising sensing a load applied to the vehicle;

selecting one of the first, second, third, and fourth steering maps when the load sensed is less than or equal to a predetermined load;

selecting a fifth steering map when the vehicle operates in the AWD mode, the first steering mode is selected, and the load sensed is above the predetermined load;

selecting a sixth steering map when the vehicle operates in the AWD mode, the second steering mode is selected, and the load sensed is above the predetermined load;

selecting a seventh steering map when the vehicle operates in the 2WD mode, the first steering mode is selected, and the load sensed is above the predetermined load; and selecting an eighth steering map when the vehicle operates in the 2WD mode, the second steering mode is selected, and the load sensed is above the predetermined load; and wherein determining the output torque includes determining the output torque corresponding to the torque applied to the steering assembly by the driver of the vehicle using the selected one of the first, second, third, fourth, fifth, sixth, seventh, and eighth steering maps.

* * * * *